United States Patent Office 3,460,654
Patented Aug. 12, 1969

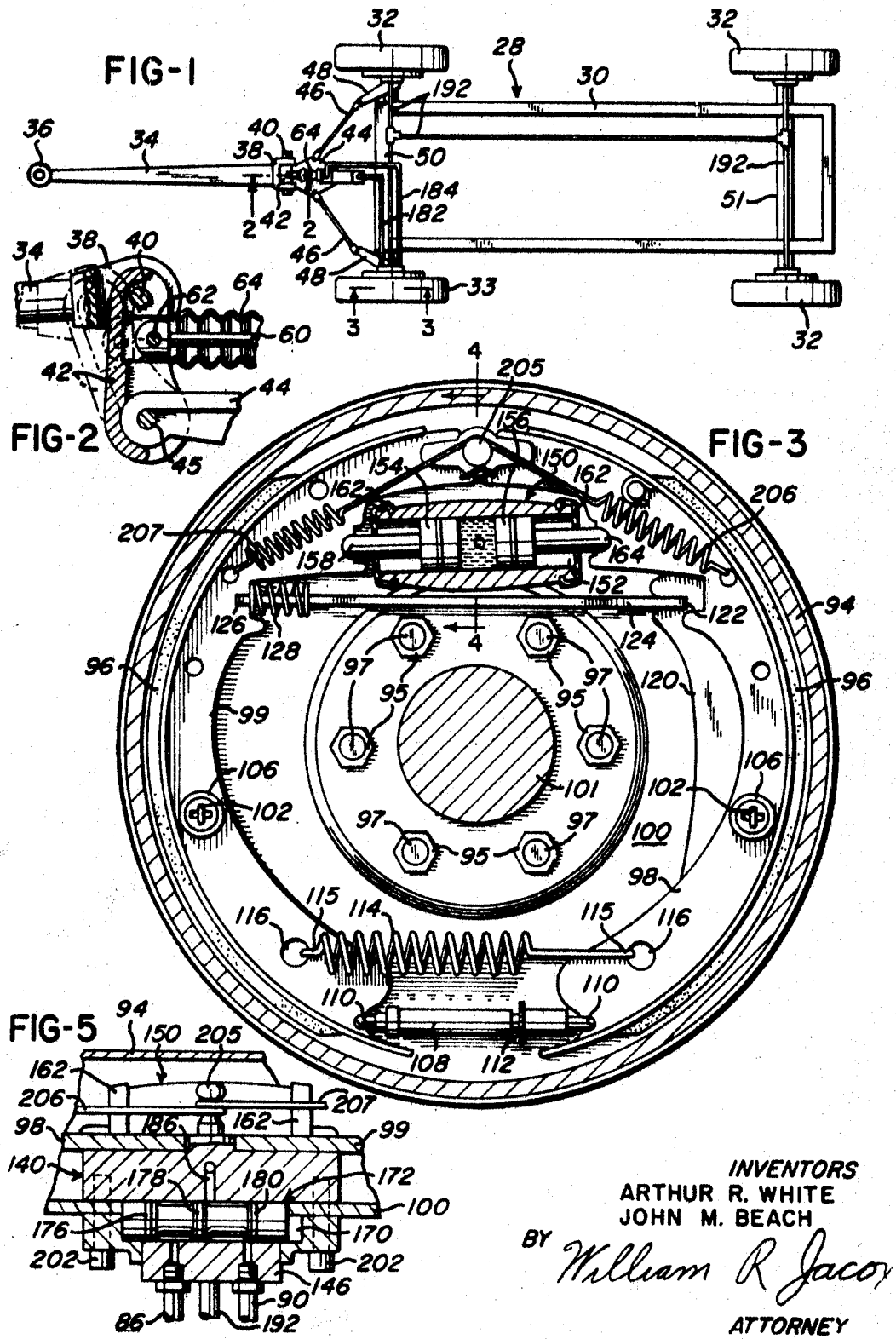

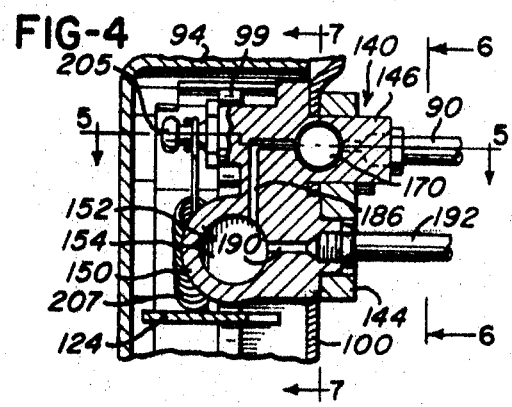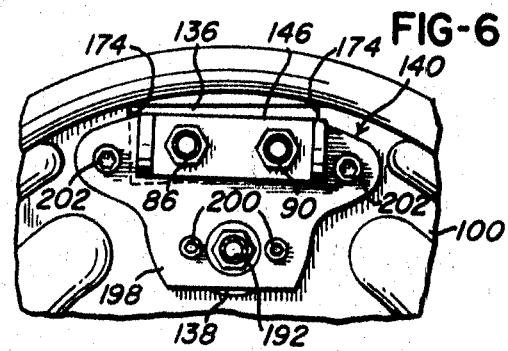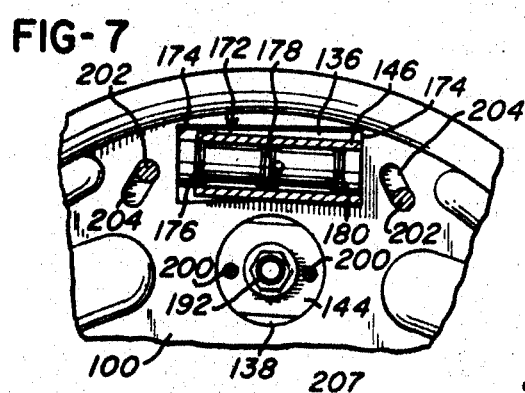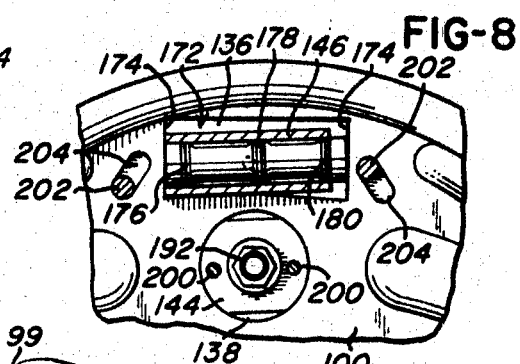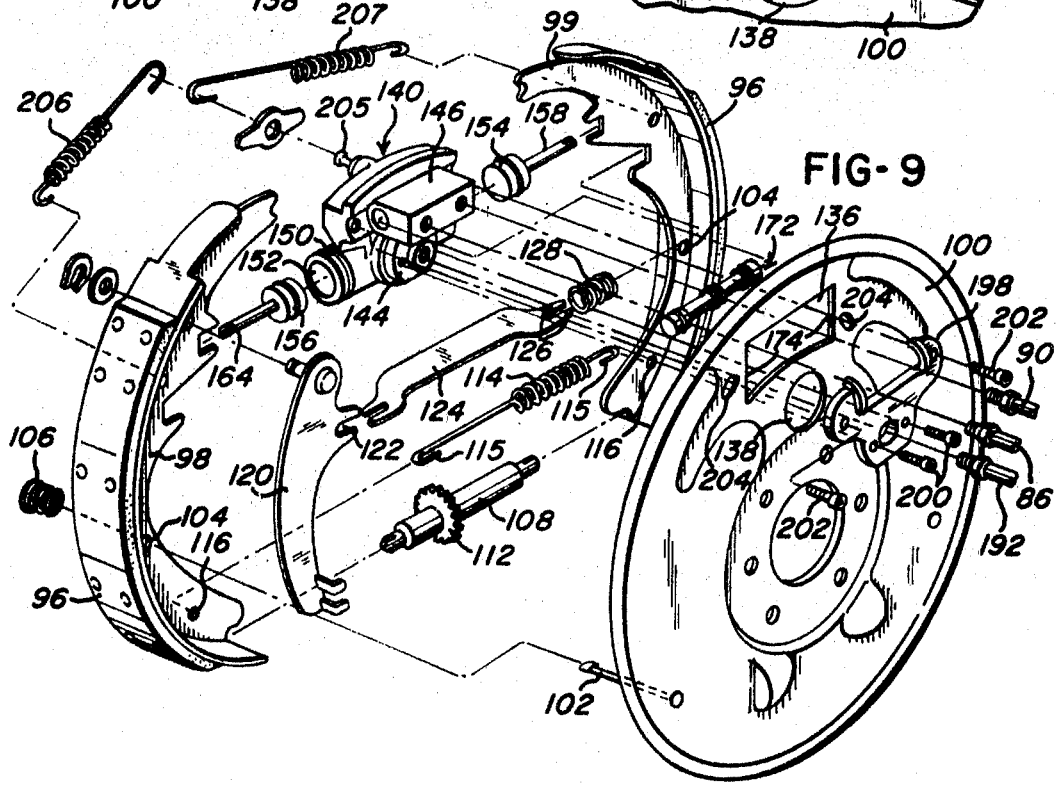

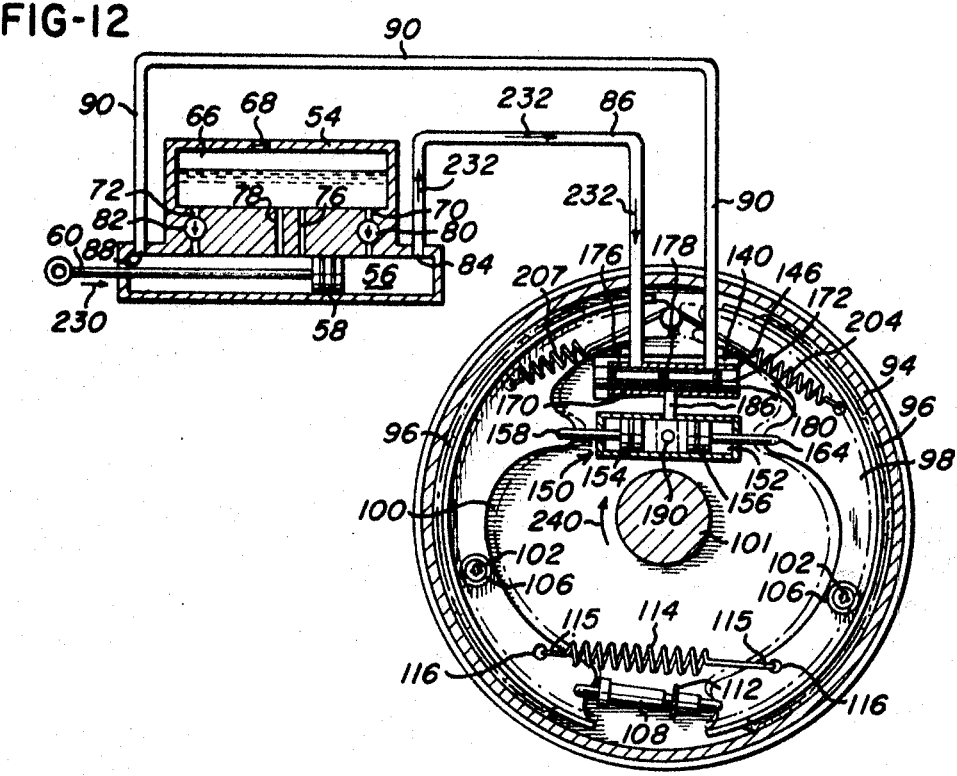

3,460,654
DIRECTIONAL ROTATION RESPONSIVE TRAILER BRAKE APPARATUS
Arthur R. White, Dayton, Ohio, and John M. Beach, 116 Davis Ave., Dayton, Ohio 45403; said White assignor to said Beach
Filed Mar. 24, 1967, Ser. No. 625,751
Int. Cl. B60t 7/20, 11/10
U.S. Cl. 188—141                    8 Claims

ABSTRACT OF THE DISCLOSURE

This invention relates to automatic brake apparatus. The automatic brake apparatus includes control means which controls the application of the brake mechanism in accordance with the direction of rotation of the wheel with which the brake apparatus is associated. Sensing means are pivotally mounted adjacent a brake drum of a trailer vehicle, the sensor being responsive to directional rotation of the wheel to control a valve means which controls the operation of the trailer brake actuator.

RELATED APPLICATION

This invention relates to the subject matter of patent application Ser. No. 416,996, filed Dec. 9, 1964, now abandoned, and owned by the assignee of this patent application.

BACKGROUND OF THE INVENTION

The invention of the aforesaid patent application includes means for automatically braking a trailer vehicle during movement thereof in either the forward direction of movement or in the reverse direction of movement. The means disclosed in the aforesaid patent application includes means for sensing the direction of movement of the trailer vehicle. The aforesaid patent application discloses means operable by rotative movement of wheel structure of the trailer vehicle for sensing the direction of movement of the trailer vehicle.

SUMMARY OF THE INVENTION

The present patent application relates to sensing means associated with drum brake structure for sensing the direction of rotative movement of wheel structure and, thus for sensing the direction of movement of a trailer vehicle for braking the trailer vehicle in either a forward direction of movement or in a reverse direction of movement. In this invention sensing means are carried adjacent a brake drum member which senses the direction of rotative movement thereof and thus controls operation of brake actuator means in accordance with the direction of rotation of the drum member.

BRIEF DESCRIPTION OF THE VIEWS OF THE DRAWINGS

FIGURE 1 is a top plan view of a trailer vehicle which includes brake apparatus of this invention.

FIGURE 2 is an enlarged sectional view taken substantially on line 2—2 of FIGURE 1.

FIGURE 3 is a greatly enlarged sectional view taken substantially on line 3—3 of FIGURE 1.

FIGURE 4 is a sectional view taken substantially on line 4—4 of FIGURE 3.

FIGURE 5 is a sectional view taken substantially on line 5—5 of FIGURE 4.

FIGURE 6 is a sectional view taken substantially on line 6—6 of FIGURE 4.

FIGURE 7 is a sectional view taken substantially on line 7—7 of FIGURE 4.

FIGURE 8 is a sectional view similar to FIGURE 7 but showing elements of the apparatus in another position of operation.

FIGURE 9 is an exploded perspective view of the brake apparatus shown in FIGURE 3.

FIGURE 12 is a diagrammatic view similar to FIGURES 10 and 11 and showing the apparatus thereof in another position of operation.

FIGURE 13 is a diagrammatic view similar to FIGURES 10, 11, and 12 and showing the apparatus thereof in another position of operation.

DETAILED DESCRIPTION OF THE APPARATUS

Figure 10:
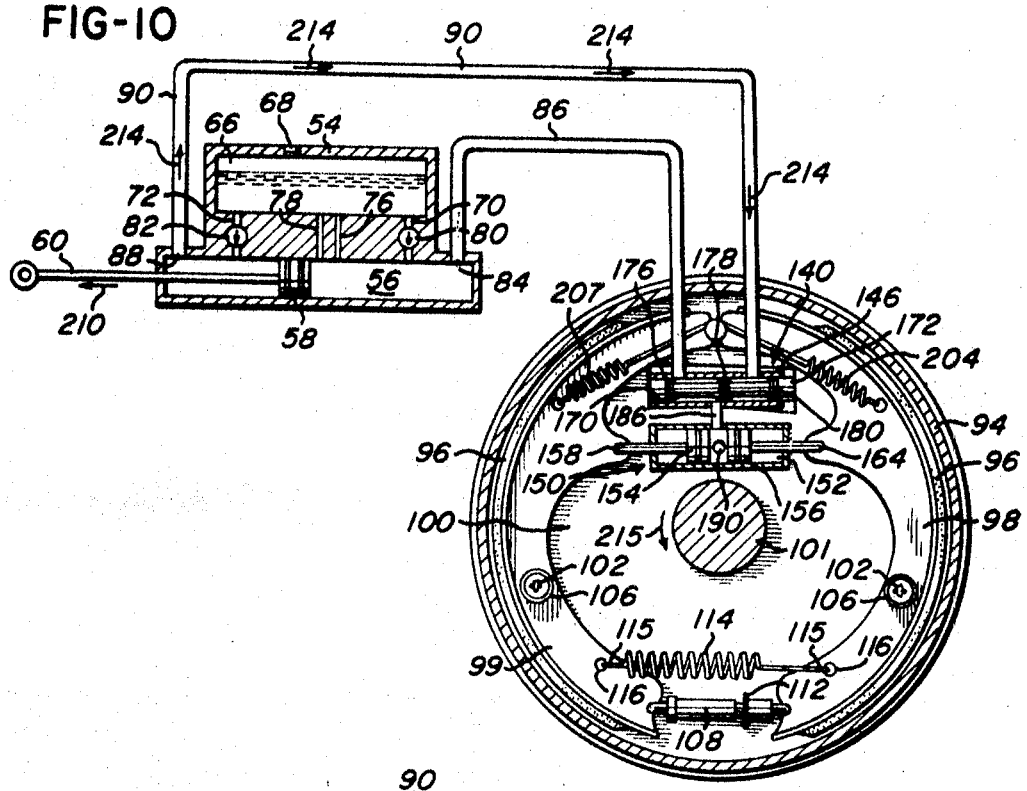
FIGURE 10 is a diagrammatic view of brake apparatus and brake operator apparatus of this invention.

Referring to the drawings in detail, FIGURE 1 shows generally a trailer vehicle 28 which has a frame 30. The trailer vehicle 28 also has a plurality of wheel structures 32 and a wheel structure 33. The front left wheel structure of the vehicle 28 is referred to as the wheel structure 33, while the other three wheel structures are referred to as wheel structures 32. The vehicle 28 also has a tow bar 34. The tow bar 34 has a forward end portion 36 which is adapted to be connected to a tow vehicle (not shown) of any suitable type. The tow bar 34 is adapted to be generally horizontal when joined to a tow vehicle. The tow bar 34 has a rearward end portion 38 which is pivotally connected by means of a pin 40 to a yoke or lever 42, shown in detail in FIGURE 2.

The yoke 42 is adapted to be normally in a generally vertical position as it extends downwardly from the tow bar 34. The lower end of the yoke 42 is pivotally joined to a turning plate 44 by means of a pin 45 shown in FIGURES 1 and 2.

The turning plate 44 is pivotally attached to a portion of the frame 30 by means not shown.

Any suitable means including linkage members 46 and 48 and the like join the turning plate 44 to the front wheel structures 32 and 33 for turning thereof. The front wheel structures 32 and 33 are carried by a front axle 50. The rear wheel structures 32 are carried by a rear axle 51.

Attached to the turning plate 44 is a housing 54 which has a cavity portion 56 and a reservoir portion 66, shown in FIGURES 10–13. Within the cavity portion 56 is an axially movable master piston 58.

A piston rod 60 is attached to the master piston 58 and extends from the housing 54 and is pivotally attached to the yoke 42 intermediate the ends thereof by a pin 62 shown in FIGURE 2. A flexible cover member 64 is shown in covering relationship to the rod 60.

The reservoir portion 66 contains any suitable fluid. A plug 68 in the upper part of the housing 54 is removable for providing an opening for communication with the reservoir 66. A passage or conduit 70 in the housing 54 joins the reservoir 66 to the cavity 56 adjacent the rearward end thereof. A passage or conduit 72 joins the reservoir 66 to the elongate cavity 56 adjacent the forward end thereof. Spaced-apart passages or conduits 76 and 78 join the reservoir 66 to the cavity 56 at positions intermediate the passages 70 and 72.

A check valve 80 is disposed within the passage 70 and permits flow of fluid therethrough only in a direction from the reservoir 66 to the cavity 56. A check valve 82 is disposed within the passage 72 and permits flow of fluid therethrough only in a direction from the reservoir 66 to the cavity 56.

A passage 84 is also formed within the housing 54 and has an end in communication with the cavity 56 adjacent the rearward end thereof. The passage 84 is in communication with a fluid conduit 86 which is connected to the housing 54. A passage 88 is also formed within the housing 54 and communicates with the cavity 56 adjacent the forward end thereof. A fluid conduit 90 is joined to the housing 54 in communication with the passage 88.

The wheel structure 33 includes a rotatable drum 94. Within the drum 94 and engageable therewith are arcuate engagement members 96 which may be of any suitable material having a high coefficient of friction. Each of the engagement members 96 is attached to an arcuate member or plate 98 or 99. Each of the carrier plates 98 and 99 is movably mounted upon a stationary plate 100 which is secured to suitable support means, not shown, carried by the trailer vehicle 28, by means of studs 97 provided with nuts 95. The stationary plate 100 encompasses a rotary shaft 101 which supports a wheel member, not shown.

A plurality of mounting nails 102 is attached to the stationary plate 100. Each mounting nail 102 extends loosely through a hole 104 in one of the carrier members 98 or 99, shown in FIGURE 9, for loosely attaching the carrier member 98 or 99 to the stationary plate 100.

A spring clip 106, shown in FIGURE 9, at the end of each mounting nail 102 retains the respective carrier member 98 or 99 upon its respective mounting nail 102 while permitting movement of the carrier member 98 or 99 in directions normal to the longitudinal axis of the mounting nail 102.

A spacer member 108 is disposed between the carrier members 98 and 99 at the lower portion thereof and maintains a given spaced relationship between the lower portion of the carrier members 98 and 99. The spacer member 108 includes an adjustment member 112 which may be rotated to alter the length of the spacer member 108 to adjust the spacing between the lower ends of the carrier members 98 and 99 to compensate for wear of the engagement members 98.

A tension spring 114 has a pair of hook ends 115, shown in FIGURE 9, each of which extends through a hole 116 in the lower portion of one of the carrier members 98 or 99 and urges the lower portion of the carrier members 98 and 99 one toward the other.

For parking brake or emergency brake use, if desired, a bracket 120 shown in FIGURE 9, is attached to the stationary plate 100 adjacent the carrier members 98. The bracket 120 has a notch 122 which receives one end of a strip 124. The other end of the strip 124 has a pair of spaced-apart fingers 126. A coil spring 128 encompasses the fingers 126. A part of the carrier members 99 is positioned between the fingers 126 as the spring 128 engages a part of the strip 124 and the carrier member 99.

The bracket 120 is movable by any suitable means, not shown, for movement of the carrier member 99 toward and away from the drum 94 for emergency brake or parking brake purposes.

The upper portion of the stationary plate 100 is provided with a substantially rectangular opening 136 and a substantially circular opening 138 therethrough, as shown in FIGURE 9. An operator and sensor unit 140 is carried by the stationary plate 100. The unit 140 has an arcuate portion 144 which extends through the opening 138 and a block portion 146 which extends through the opening 136. The unit 140 also has a tubular portion 150 provided with a cavity 152 extending therethrough. The tubular portion 150 is disposed at one side of the stationary plate 100.

Within the cavity 152 are spaced-apart pistons 154 and 156. The piston 154 has a stem 158 which extends outwardly from the cavity 152 has a stem 158 which extends outwardly from the cavity 152 through a sealing member 162 and engages the carrier member 99. The piston 156 has a stem 164 which extends outwardly through a sealing member 162 and engages the carrier member 98.

The block portion 146 of the unit 140 is provided with a bore 170 therethrough. Within the bore 170 is an elongate valve member 172. The valve member 172 extends from the bore 170 at both ends thereof and engages wall members 174 which form the ends of the opening 136. The valve member 172 has spaced-apart sealing members 176, 178, and 180 which are in slidable engagement with the surfaces of the bore 170 within which the valve member 172 is disposed.

The fluid conduits 86 and 90 extend from the housing 54 to the bore 170, as shown in FIGURES 5, 10, 11, 12, and 13. A fluid conduit 186 leads from the bore 170 to the cavity 152, as shown in FIGURES 4, 10, 11, 12, and 13. A fluid passage 190 leads from the cavity 152 to a fluid conduit 192, as shown in FIGURE 4. The fluid conduit 192 is in communication with the passage 190 and extends from the arcuate portion 144 of the unit 140 to the wheel structures 32, as shown in FIGURE 1.

A cap member 198, shown in FIGURE 6 and 9 is attached to the arcuate portion 144 of the unit 140 by means of screws 200. Also screws 202 extend through the cap member 198 and through slots 204 in the stationary plate 100, shown in FIGURES 6, 7, 8, and 9, and into the unit 140. The screws 202 do not tightly draw the cap member 198 into engagement with the stationary plate 100. Thus, the unit 140 is pivotally movable with respect to the stationary plate 100. The unit 140 pivotally moves about an axis which is substantially coaxial with the axis of the arcuate portion 144 of the unit 140.

Each of the wheel structures 32 of the trailer vehicle 28, shown in FIGURE 1, has a drum brake apparatus or disc brake apparatus or any other type of brake apparatus which operates by fluid pressure supplied through the conduit 192 which extends from the arcuate portion 144 of the unit 140.

The unit 140 has a stud or abutment member 205. A spring 206 is attached to the stud 205 and to the carrier member 98. A spring 207 is attached to the stud 205 and to the carrier member 99. The springs 206 and 207 urge the upper portions of the carrier members 98 and 99 toward the stud 205.

OPERATION

As stated above, the end portion 36 of the tow bar 34 is adapted to be connected to a tow vehicle. This is the only connection which is necessary between a tow vehicle and a trailer vehicle which is provided with brake apparatus of this invention.

As shown in FIGURE 2, the tow bar 34 is joined to the yoke 42, and the piston rod 60 is joined to the yoke 42. Therefore, when a tow vehicle which is connected to the tow bar 34 moves forwardly to pull the trailer vehicle 28, the tow bar 34 moves forwardly with the tow vehicle.

When the tow bar 34 is moved forwardly, which is to the left, as shown in FIGURES 1 and 2, the yoke 42 is moved to an angularly inclined forward position, as illustrated in FIGURE 2. When the yoke 42 moves forwardly to an angularly inclined position, the yoke 42 pulls the piston rod 60 forwardly and moves the piston 58 forwardly within the cavity 56. Due to the fact that the piston rod 60 is operated by the tow bar 34 through the yoke 42, a mechanical advantage and a high degree of sensitivity is obtained in the operation of the piston rod 60. Of course, other connection means and operator means for the piston rod 60 with respect to a tow vehicle may also be satisfactory.

Operation of apparatus of this invention with forward movement of the trailer vehicle 28, resulting from pulling movement of a tow vehicle, is illustrated in FIGURE 10. As viewed in FIGURE 10 and as illustrated by an arrow 210, forward movement of the trailer vehicle 28 is toward the left. The piston rod 60 is pulled to the left by the tow bar 34 and by the yoke 42, to which the piston rod 60 is connected. Thus, when a tow vehicle pulls the trailer vehicle 28, the master piston 58 is moved to the left within the cavity 56, as shown in FIGURE 10.

The cavity 56 and the fluid conduits 86 and 90 and 192 are also filled with fluid which has moved thereto through the reservoir 66. Thus, when the master piston 58 moves toward the left within the cavity 56, as shown in FIGURE 10, the master piston 58 applies pressure to the fluid which is to the left of the master piston 58 within the cavity 56.

As shown in FIGURE 10, the master piston 58 has moved to the left of the passages 76 and 78 within the housing 54. Thus, the pressure of the fluid within the cavity 56 to the left of the piston 58 exists within the lower portion of the passage 72. However, the check valve 82 within the passage 72 permits flow of fluid in the passage 72 only in the direction from the reservoir 66 to the cavity 56. Thus, the fluid pressure which is created by the piston 58 within the cavity 56 is transmitted to the fluid within the conduit 90, as illustrated by arrows 214 in FIGURE 10.

The fluid passages or conduits 76 and 78 which extend between the reservoir 66 and the cavity 56 permit flow of fluid therethrough with movement of the piston 58 within the cavity 56 so that the portion of the cavity 56 to the left of the master piston 58 receives additional fluid from the reservoir 66 as the master piston 58 moves toward the left as shown in FIGURE 10.

As stated above and as shown in the drawings, the fluid conduits 86 and 90 extend from the housing 54, which is adjacent the tow bar 34, to the left front wheel structure 33 of the trailer vehicle 28. As shown in FIGURE 10, the conduit 86 communicates with the left hand portion of the bore 170, while the conduit 90 communicates with the right hand portion of the bore 170 within the block portion 146 of the unit 140.

When the trailer vehicle 28 is traveling forwardly, the wheel structures 32 and 33 thereof are rotating counterclockwise, as illustrated by an arrow 215 in FIGURE 10. Thus, the brake drum 94 of the wheel structure 33 is rotating counterclockwise. For a reason discussed below, when the drum 94 is rotating counterclockwise as shown in FIGURE 10, the unit 140 is pivoted in a counterclockwise direction, as shown by the position of the block portion 146 in FIGURE 10. FIGURES 6 and 7 show the unit 140 from the other side of the stationary plate 100. Thus, the unit 140 is shown as being pivoted clockwise therein. When the unit 140 pivotally moves, such pivotal movement occurs generally about the axis of the arcuate portion 144 of the unit 140. Due to the fact that the block portion 146 of the unit 140 freely extends through the opening 136 of the stationary plate 100, the block portion 146 is pivotally movable within the opening 136. However, such pivotal movement of the unit 140 is limited by engagement of the block portion 146 with one of the end walls 174 of the opening 136, as shown in FIGURES 7, 8, and 10.

Also, with pivotal movement of the unit 140, the screws 202 move within the slots 204, as shown in FIGURES 7 and 8, as the cap member 198 which is attached to the unit 140, pivotally moves therewith, as shown in FIGURE 6.

Due to the fact that the valve member 172 has the ends thereof in engagement with the end walls 174 of the opening 136, the valve member 172 does not move with movement of the block portion 146 of the unit 140.

Therefore, when the block portion 146 moves with pivotal movement of the unit 140, relative movement occurs between the block portion 146 and the valve member 172. When such relative movement between the block portion 146 and the valve member 172 occurs, the valve member 172 and the block portion 146 become relatively positioned as shown in FIGURES 7 and 10. Thus, as shown diagrammatically in FIGURE 10, the fluid conduit 86 is in communication with the passage 186, through the bore 170 between the sealing members 176 and 178 of the valve member 172. However, due to the fact that the master piston 58 within the cavity 56 of the housing 54 is being urged toward the forward end of the cavity 56, as illustrated in FIGURE 10, appreciable fluid pressure is applied to the conduit 90. Thus, appreciable fluid pressure is applied to the portion of the bore 170 between the sealing members 178 and 180. However, due to the fact that the sealing member 178 is between the conduit 90 and the passage 186, the fluid pressure within the conduit 90 cannot be applied ot the passage 186.

Therefore, as the master piston 58 is urged forwardly, as shown in FIGURE 10, by pulling of a tow vehicle which is operatively connected to the piston rod 60, there is not appreciable fluid pressure exerted upon the pistons 154 and 156 within the cavity 152. Thus, the wheel structures 32 and 33 rotate freely without braking operation thereupon.

Fluid within the conduit 90 which is under pressure caused by force of the piston 58 cannot flow. Therefore, the fluid which is within the cavity 56 at the left of the piston 58 within the housing 54 and within the conduit 90 is under substantially static pressure. The static pressure is in direct relationship to the pulling forces exerted upon the tow bar 34 as a tow vehicle tows the trailer vehicle 28.

Figure 11:
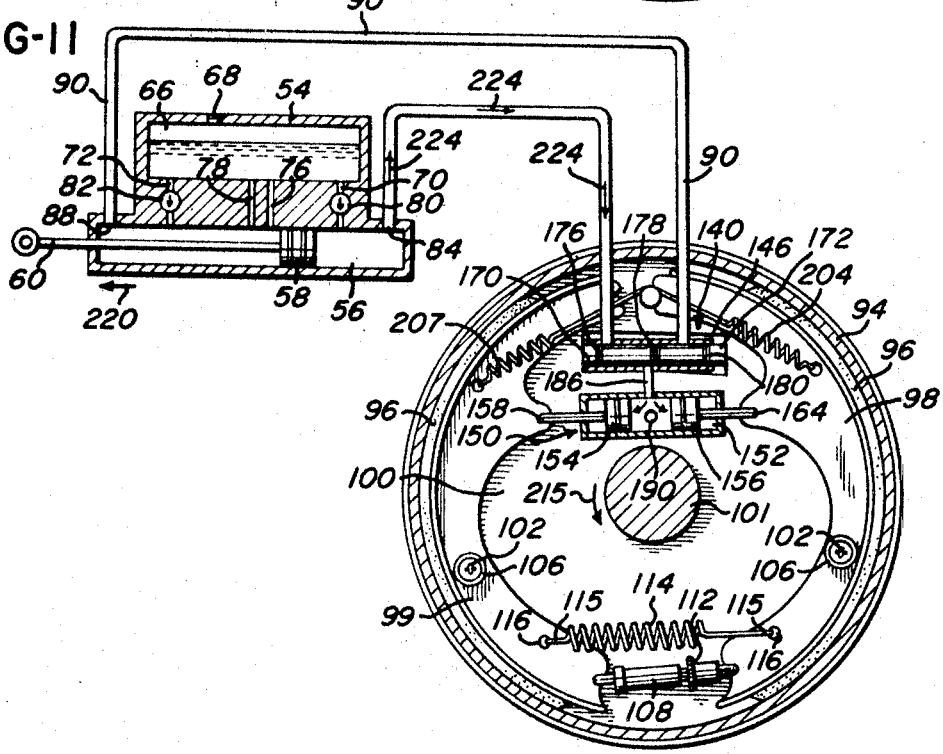
FIGURE 11 is a diagrammatic view, similar to FIGURE 10, and showing the apparatus thereof in another position of operation.

However, when the tow vehicle which is operatively connected to the piston rod 60 slows down or stops, the trailer vehicle 28, by inertia, momentarily tends to continue its rate of forward movement, as indicated by the arrow 215 in FIGURE 11. Thus, there is momentary relative movement between the trailer vehicle 28 and its tow vehicle. Therefore, there is momentary relative movement between the housing 54 and the master piston 58, as illustrated by an arrow 220 in FIGURE 11, as the housing 54, with the trailer vehicle 28, moves forwardly with the respect to the piston rod 60 and the piston 58. Thus, the master piston 58 becomes positioned between the passage 76 and the passage 70 in the cavity 56. Due to the fact that the passage 70 has the check valve 80 therein, fluid cannot flow through the passage 70 in a direction from the cavity 56 to the reservoir 66. Therefore, appreciable pressure is applied to the fluid within the cavity 56 to the right of the master piston 58 and the same pressure is applied to the fluid within the conduit 86, as illustrated by arrows 224 in FIGURE 11.

Due to the fact that the front wheel structure 33 is rotating forwardly, the unit 140 is pivoted forwardly, as shown in FIGURES 10 and 11. Thus, the relative position between the block portion 146 and the valve member 172 is as shown in FIGURES 10 and 11. Thus, fluid can flow from the conduit 86 through the bore 170, between the sealing members 176 and 178, and into the passage 186 and into the cavity 152 between the pistons 154 and 156. Thus, the appreciable fluid pressure which is exerted by the master piston 58, in the position thereof shown in FIGURE 11, is exerted upon the pistons 154 and 156 in the cavity 152. Thus, the piston stems 158 and 164 are forced to move axially one from the other and in a direction from the cavity 152 Therefore, the carrier members 98 and 99 and the engagement members 96 which are carried thereby are forced toward the drum 94. Therefore, a braking action occurs as the engagement members 96 engage the drum 94. When the engagement members 96 engage the drum 94, the carrier members 98 and 99 tend to rotate with the drum 94 but are prevented therefrom by the stud 205 which is engaged by the carrier member 98, as shown in FIGURE 11.

The amount of fluid pressure applied to the pistons 154 and 156 for braking operation is dependent upon the force exerted between the trailer vehicle 28 and its tow vehicle as the rate of travel of the tow vehicle is reduced. The fluid pressure applied to the pistons 154 and 165 in the cavity 152 is also transmitted through the fluid conduits 192 to the wheel structures 32 for braking thereof. Regardless of the rate of decrease of the forward travel of the tow vehicle, the master piston 58 automatically operates to apply sufficient fluid pressure to the pistons 154 and 156 to brake the trailer vehicle 28 to the rate of travel of the tow vehicle. This includes braking the trailer vehicle 28 to a stop when the tow vehicle stops.

After the trailer vehicle 28 is stopped, it may be desired to have the tow vehicle push the trailer vehicle 28 in a reverse direction. Reverse movement of the tow vehicle urges the tow bar 34 to move rearwardly so that the piston rod 60 and the master piston 58 are urged rearwardly, as illustrated by an arrow 230 in FIGURE 12. Thus, appreciable fluid pressure is again applied by the master piston 58 to the conduit 86, as illustrated by arrows 232 in FIGURE 12. Due to the fact that the trailer vehicle 28 stopped with the carrier plates 98 and 99 in the positions thereof shown in FIGURE 11, the carrier plates 98 and 99 are in the positions thereof shown in FIGURE 11 when the tow vehicle begins to push the trailer vehicle 28 rearwardly. Thus, the valve member 172 and the block member 146 are positioned one with respect to the other, in the manner shown in FIGURE 11, when the tow vehicle begins to push the trailer vehicle 28 rearwardly. Therefore, when the pushing action upon the trailer vehicle 28 begins to occur, fluid pressure is applied through the fluid conduit 86 through the bore 170, between the sealing members 176 and 178, and through the passage 186 to the cavity 152.

Thus, a braking action is again applied to the carrier members 98 and 99 and to the engagement members 96. Thus, the wheel structure 33 has braking forces applied thereto. Furthermore, braking forces are again applied to the wheel structures 32 through the conduits 192.

However, as discussed above, the carrier members 98 and 99 have limited movement with rotative movement of the drum 94. Therefore, as the tow vehicle forces the trailer vehicle 28 rearwardly, the drum 94 rotates in a clockwise direction.

Such clockwise movement of the drum 94 causes the engagement members 96 which are in engagement therewith and the carrier members 98 and 99, which carry the engagement members 96, to move in a clockwise direction wtih the drum 94. The movement of the carrier members 98 and 99 with clockwise movement of the drum 94 causes the carrier member 99 to engage the stud 205, as shown in FIGURE 12. Pressure of the carrier member 99 upon the stud 205, as the carrier member 99 moves with the drum 94, causes the unit 140 to pivotally move clockwise until the block portion 146 of the unit 140 engages the right hand end wall 174 of the opening 136 as shown in FIGURE 12. Due to the fact that the valve member 172 has no appreciable movement with respect to the stationary plate 100, movement of the block portion 146 to the right, as shown in FIGURE 12, causes relative movement between the block portion 146 and the valve member 172 therewithin.

Therefore, communication between the passage 186 and the conduit 86 is closed as the sealing member 178 becomes positioned between the passage 186 and the conduit 86. Communication then exists between the passage 186 and the conduit 90 for flow of fluid from the cavity 152 to the bore 170. Thus, there is reduction of fluid pressure within the cavity 152. Thus, the springs 206 and 207 draw the carrier members 98 and 99 one toward the other, and the engagement members 96 move out of engagement with the drum 94. Thus, braking action upon the drum 94 of the wheel structure 33 is removed. Furthermore, fluid braking pressure upon the wheel structures 32 through the conduits 192 is also removed. Therefore, the wheel structures 32 and 33 are free to rotatively move clockwise, as illustrated by an arrow 240 in FIGURE 12, as the trailer vehicle 28 is pushed rearwardly by a tow vehicle.

When the tow vehicle reduces its rate of movement as the trailer vehicle 28 is being pushed thereby in a reverse direction, momentary relative movement between the tow vehicle and the trailer vehicle 28 occurs. Therefore, momentary relative movement between the piston rod 60 and the housing 54 results, and a force in a forward direction is applied to the piston rod 60, as illustrated by an arrow 246 in FIGURE 13. Thus, the piston rod 60 and the master piston 58 move toward the forward portion of the cavity 56 of the housing 54, as illustrated in FIGURE 13.

When the master piston 58 moves to a forward position within the cavity 56, the master piston 58 causes the fluid pressure to be removed from the conduit 86 and appreciable fluid pressure is applied to the fluid within the conduit 90 as illustrated by arrows 250 in FIGURE 13. Due to the fact that there is communication between the conduit 90 and the passage 186, through the bore 170, the fluid pressure within the conduit 90 is applied to the cavity 152 and to the pistons 154 and 156 therewithin. Therefore, the pistons 154 and 156 are forced one from the other and the carrier members 98 and 99 and the engagement members 96 are again forced toward the drum 94. Thus, there is braking action upon the drum 94 of the wheel structure 33. Fluid pressure within the cavity 152 is also transmitted to the wheel structures 32 through the conduits 192 for braking thereof to the degree necessary to maintain the rate of travel of the trailer vehicle 28 equal to the rate of travel of the tow vehicle.

If the tow vehicle comes to a complete stop, a fluid pressure sufficient to completely stop rotation of the wheel structures 32 and 33 is applied automatically by the master piston 58 to the wheel structures 32 and 33.

Whenever there is reduction of the rate of travel of a tow vehicle which is joined to the trailer vehicle 28, braking pressure is automatically applied to the wheel structures 32 and 33 of the trailer vehicle 28. The braking pressure is applied automatically to the degree necessary to maintain the rate of travel of the trailer vehicle 28 equal to the rate of travel of the tow vehicle. Thus, a relatively small tow vehicle is capable of continuous braking control of the trailer vehicle. The tow vehicle need only be of a size necessary to propel the trailer vehicle.

Thus, the apparatus of this invention includes means by which one or more wheel structures of a trailer vehicle may include drum brake apparatus which is automatically braked in accordance with relative movement between a tow vehicle and the trailer vehicle.

The invention having thus been described, the following is claimed:

1. Apparatus of the type described comprising:
   stationary support means,
   a drum member rotatable adjacent the stationary support means,
   carrier means movably carried by the stationary support means,
   engagement means attached to the carrier means and engageable with the drum member,
   a sensing and actuator unit pivotally carried by the stationary support member, the sensing and actuator unit having an abutment member which is engageable by the carrier means for pivotal movement of the unit, means carried by the stationary support means and engageable by the unit for limiting the degree of pivotal movement thereof,
   the unit having a bore therein, a valve member within the bore, means for locating the valve member with respect to the stationary support means so that upon pivotal movement of the unit there is relative movement between the unit and the valve member, the unit also having a cavity, piston means within the cavity, force transmission means attached to the piston means and movable therewith and engageable with at least one of the carrier members for movement thereof toward the drum member, conduit means for introducing fluid into the bore, passage means joining the bore to the cavity for flow of fluid therebetween, relative movement between the valve member and the unit with pivotal movement of the unit causing a change in communication between the bore and the passage means for controlling communication between the bore and the cavity so that when a given relative position between the valve member and the unit exists there is flow of fluid through the passage means from the bore to the cavity for operation of the piston means, operation of the piston means causing movement of the carrier means so that the engagement means moves into engagement with the drum, so that rotative movement of the drum urges the carrier means to move in the direction of movement of the drum to apply a pressure upon the abutment member of the unit so that the unit is urged to pivotally move.

2. Apparatus of the type described comprising:

a rotatable drum, the drum having a brake surface which is substantially parallel to the axis of rotation thereof, stationary support structure, brake means carried by the support structure and disposed within the drum, the brake means movable with respect to the support structure, brake control means, the brake control means having a part which is substantially fixed with respect to the stationary support structure and a part which is movable with movement of the brake means, the brake control means being operable by relative movement between the said parts thereof, the brake control means thus being operable to control the brake means with movement of the brake means with respect to the stationary support structure.

3. Apparatus of the type described comprising:

stationary support structure, a drum rotatable with respect to the support structure, the drum having a braking surface which is substantially parallel to the axis of rotation thereof, the braking surface facing the axis of rotation thereof, brake apparatus carried by the stationary support structure and disposed within the drum, the brake apparatus including engagement means movable toward and away from the braking surface of the drum and engageable therewith, the engagement means also having limited movement in the direction of rotative movement of the drum.

brake actuator means carried by the stationary support structure and operably joined to the brake apparatus for moving the engagement means into engagement with the braking surface of the drum, control means joined to the brake actuator means for control of the brake actuator means with operation of the control means, the control means having a portion which is operably connected to the engagement means of the brake apparatus, the control means being operable with movement of the engagement means with rotative movement of the drum.

4. Apparatus of the type described comprising:

support structure, a drum adjacent the support structure and rotatable with respect thereto, brake apparatus carried by the support structure, the brake apparatus including engagement means movable toward and away from the drum and engageable therewith, the engagement means also having limited movement in the direction of rotative movement of the drum, fluid operable brake actuator mechanism carried by the support structure and operably joined to the brake apparatus for moving the engagement means into engagement with the drum, fluid valve means, the fluid valve means having a portion which is substantially fixed with respect to the support structure, the fluid valve means having a portion which is movable with movement of the engagement means in the direction of movement of the drum, the fluid valve means being operable by relative movement between said portions of the fluid valve means, conduit means joining the fluid operable brake actuator apparatus to the fluid valve means so that operation of the fluid valve means controls flow of fluid to the brake actuator mechanism for operation thereof.

5. In drum brake apparatus of the type having a rotatable drum, a pair of carrier members within the confines of the drum and movable toward and away from the drum, a pair of brake pads, there being a brake pad secured to each of the carrier members and movable by its respective carrier member into engagement with the drum, each of the carrier members having limited movement in the direction of rotative movement of the drum, there being fluid actuated brake operator means operable upon the carrier members for movement thereof toward the drum, the improvement comprising:

a control unit pivotally disposed adjacent the carrier members, the control unit having an abutment portion engageable by either of the carrier members for pivotal movement of the control unit, means for joining the control unit to a source of fluid, the control unit including valve means, means for operation of the valve means with pivotal movement of the control unit, fluid conduit means joining the control unit to the brake operator means for flow of fluid between the control unit and the brake operator means, the brake operator means thus being operable in accordance with the operation of the valve means, the valve means thus being operable with movement of one of the carrier members in the direction of rotative movement of the drum.

6. In drum brake apparatus of the type having a rotatable drum, a pair of carrier members within the confines of the drum and movable toward and away from the drum, a pair of brake pads, there being a brake pad secured to each of the carrier members and movable by its respective carrier member into engagement with the drum, each of the carrier members having limited movement in the direction of rotative movement of the drum, there being fluid actuated brake operator means operable upon the carrier members for movement thereof toward the drum, the improvement comprising:

a valve means disposed adjacent the carrier members, means operably connecting the valve means to the carrier members for operation of the valve means with movement of either of the carrier members in the direction of rotative movement of the drum, means for joining the valve means to a source of supply of fluid, fluid conduit means joining the valve means to the brake operator means, the brake operator means thus being operable in accordance with the operation of the valve means, the valve means being operable with movement of one of the carrier members in the direction of rotative movement of the drum.

7. The apparatus of claim 6 in which the means operably connecting the valve means to the carrier members comprises abutment means carried by the valve means and engageable by either one of the carrier members for operation of the valve means.

8. The apparatus of claim 7 in which the valve means is pivotally movable for operation thereof, the valve means being pivotally moved by either one of the carrier members as the carrier member engages the abutment means and causes pivotal movement of the valve means.

References Cited

UNITED STATES PATENTS

| 2,340,464 | 2/1944 | Gates | 188—152 |
| 2,734,599 | 2/1956 | Merritt | 188—141 |
| 3,326,333 | 6/1967 | Rockwell | 188—181 |

DUANE A. REGER, Primary Examiner

U.S. Cl. X.R.

188—112, 142, 152